United States Patent [19]

Branam

[11] Patent Number: 4,987,358

[45] Date of Patent: Jan. 22, 1991

[54] ELECTRONIC TORQUE SWITCH

[76] Inventor: Timothy R. Branam, 837 N. 11th St., Manitowoc, Wis. 54220

[21] Appl. No.: 341,368

[22] Filed: Apr. 21, 1989

[51] Int. Cl.⁵ .......................................... H02K 27/30
[52] U.S. Cl. .................................. 318/603; 318/282; 318/434
[58] Field of Search ............................. 318/280–284, 318/599–626, 466, 254, 434, 433, 809, 440, 810, 756, 689

[56] References Cited

U.S. PATENT DOCUMENTS

| Re. 32,579 | 1/1988 | Harvey et al. | 318/282 X |
|---|---|---|---|
| 3,926,264 | 12/1975 | Bardwell et al. | 318/434 X |
| 4,066,942 | 1/1978 | Bardwell et al. | 318/434 |
| 4,156,162 | 5/1979 | Warfield et al. | 318/434 |
| 4,303,873 | 12/1981 | Hawkins | 318/434 X |
| 4,445,075 | 4/1984 | Fry | 318/434 |
| 4,451,771 | 5/1984 | Nagase et al. | 318/802 X |
| 4,463,291 | 7/1984 | Usry | 318/254 |
| 4,482,855 | 11/1984 | Otsuka et al. | 318/807 X |
| 4,491,775 | 1/1985 | Harvey et al. | 318/282 |
| 4,587,469 | 5/1986 | Ikebe et al. | 318/561 X |
| 4,628,475 | 12/1986 | Azusawa et al. | 318/802 X |
| 4,764,720 | 8/1988 | Nystrom | |
| 4,794,309 | 12/1988 | Saito et al. | 318/466 X |
| 4,844,110 | 7/1989 | Paley | |

Primary Examiner—Paul Ip
Attorney, Agent, or Firm—Andrus, Sceales, Starke & Sawall

[57] ABSTRACT

An electronic torque switch provides substantially enhanced control in an electric motordriven torque supplying system. Utilizing an accurate and real time measurement of motor operating power, a correlation may be made with the output torque to control operation of the motor. The switch may use an operating signal based either on the absolute level of operating power or on the rate of change of operating power to control, for example, valve seating thrust levels in a motor operated valve.

16 Claims, 3 Drawing Sheets

ELECTRONIC TORQUE SWITCH

BACKGROUND OF THE INVENTION

The present invention relates to the control of operating torque in torque or thrust inducing systems and, more particularly, to an electronic torque switch for controlling the operation of electric torque motors.

Electric torque motors, such as AC induction motors, are used in a variety of applications where output torque is transferred via a mechanical transmission or operator and appears as torque or thrust on a workpiece being operated. For example, electric motor driven operators are used extensively for the operation of various kinds of valves in the power generation, chemical and petrochemical industries. Remote operation of these valves is often necessary or desirable because of the critical nature of the valve operation or its hazardous location. Further, precise control of valve operation is often necessary both to maintain proper control of a critical process or to protect personnel or equipment. Also, in most cases a motor operated valve cannot be installed and set up (or inspected and tested after installation) under actual operating conditions with fluid flow in the system in which the valve is installed. Therefore, motor operated valves are typically adjusted for proper operation, either initially or after periodic maintenance, under static conditions. It is well known, however, that many of the characteristics of valve operation change or vary substantially under dynamic operating conditions. Such variations may be immediately apparent or appear or become aggravated with time and are dependent on such conditions as the actual fluid operating pressure, operator gear train and valve packing wear, variations in operating voltage supplied to the motor, and the quality of periodic maintenance.

The torque delivered by a torque motor in a torque or thrust inducing system, such as the torque applied to a valve stem by a motor-driven operator, is typically controlled by electromechanical torque switches. A torque switch in a typical mechanical valve operator assembly operates off of a motor driven worm in the transmission assembly delivering torque to the valve stem. The torque-induced thrust on the valve stem is transmitted to the worm and results in a force tending to move the worm on its longitudinal axis. The worm is typically attached to the operator housing through a spring pack, and as the axial thrust on the worm increases as a result of increasing stem thrust, the spring pack will deflect and the worm will move axially. Axial movement of the worm against the bias of the spring pack is used to move a torque switch arm, the movement of which is adjustable, to set the point at which the torque switch contacts open to stop the torque motor. Motor operated valve assemblies also utilize electromechanical limit switches, typically operated by gear train movement, to stop valve travel in the open direction before the valve backseats, to bypass the open torque switch as the valve is being unseated, to provide remote light indication of valve position, and to actuate interlocks with other equipment. A detailed discussion of the construction and operation of a motor operated valve, controlled by the above type of electromechanical torque and limit switches is contained in U.S. Pat. No. 4,856,327, entitled "Method and Apparatus for Monitoring and Measuring Dynamic Loads in Thrust Inducing Systems".

As indicated in the foregoing patent, torque and limit switches used to control motor operated valves are typically difficult to adjust, require the use of skilled personnel, and are typically rather imprecise such that minor changes in the switch setting can result in large changes in stem thrust actually applied to the valve. In addition, however, an equally serious problem results from the fact that the spring pack displacement utilized to actuate the torque switch is not a direct indication of actual stem thrust and, as a result, the actual thrust levels at which torque switch trip occurs may be either far lower than that required to properly seal the valve or higher than the levels which the valve and valve operator can safely withstand without damage. It is suspected that inconsistencies in the operation of electromechanical torque switches may be attributed to the Belleville spring pack. Although the apparatus and method disclosed in the above identified co-pending application provide a significant improvement in monitoring the operation of motor operated valves utilizing state of the art electromechanical torque switches, ultimate control of torque motor operation still relies on the electromechanical torque switch, the deficiencies of which in controlling the thrust output of a motor operated valve assembly are well documented. Thus, although actual operating thrust values may be measured and monitored accurately, reliance on existing switches to ultimately control torque output results in a number of serious potential problems, such as: (1) unacceptable deviations in repeatability of operation, (2) unacceptably large thrust changes resulting from minor changes in switch settings, (3) grease migration from the operator into the mechanical torque switch assembly affecting proper operation and resulting in unacceptably high thrusts, (4) the need to make torque switch adjustments at the operator itself, requiring highly skilled personnel and the use of extreme care, and (5) the loss of safety margins built into torque switch settings as a result of valve packing adjustments, operator wear, or poor maintenance procedures.

There is, therefore, a need for a reliable torque switch for more accurate control of the torque delivered by a torque motor in a motor operated valve assembly or similar thrust inducing systems. Such a switch should also be compatible with and usable in existing motor operated valve designs, either as a part of an original installation or on a retrofit basis.

SUMMARY OF THE INVENTION

The present invention is directed to an electronic torque switch which provides accurate, real time control of an electric torque motor. Operation of the switch is based on and utilizes the measurement of motor operating power, which power corresponds directly to the power output of the operator being driven by the motor. Thus, for example, the torque or thrust being delivered to a workpiece, by an interconnected operator assembly driven by an electric torque motor may be accurately measured and controlled utilizing the torque switch of the present invention.

The torque switch of the present invention is particularly well adapted to control the operation of a motor operated valve assembly of the type in which a valve closure means attached to a stem operates within a valve body to move between open and closed positions. Operating torque or thrust is applied to the valve stem by an electric torque motor, via a mechanical transmission means operatively connecting the motor and the valve stem. The electronic torque switch is operable to deactivate the torque motor at a desired level of operating torque and includes means for generating a signal representative of the motor operating power and for generating a reference power signal representative of the desired maximum level of operating torque. A comparator means receives the motor power and reference power signals and generates an output control signal when the motor power signal exceeds the reference power signal, which control signal is utilized to operate a switch to stop the motor.

The electronic torque switch is, in a preferred embodiment, adaptable for use with an AC induction torque motor and includes a multiplier circuit which generates the motor operating power signal from the product of motor voltage and current signals. The AC power signal is filtered with an active filter to preclude any significant time lag and to retain essentially real time control signal generation. The switch may also be used in DC applications and, although the active filter is not necessary, it will not detract from circuit performance.

Preferably, the operating power and reference power signals are selected to indicate the rate of change of power delivered which, in a typical motor operated valve, is at its highest level when the valve seats at the end of the close stroke (or in the undesirable event of backseating, when the valve reaches the end of its open stroke). The rate of change of power signal may be used directly to deactivate the torque motor or it may be integrated with a time signal to delay motor deactivation until, for example, a desired level of valve seating thrust is attained. Suitable time delay means may also be utilized to preclude motor deactivation by spurious signals resulting from other high operating power peaks during cycling of the valve, such as initial motor start up, movement of the valve off of its seat upon initiation of the open stroke, or high differential pressure conditions in the valve.

Use of an operating power signal to control operation of a torque motor eliminates the inaccuracies inherent in control systems based on the measurement of current or voltage only. Equally importantly, the electronic torque switch of the present invention eliminates the inaccuracies recognized to be inherent in the electromechanical torque switches presently used. In addition to providing accurate control of valve closing torque or thrust, the switch may also be used as a back-up to prevent serious valve and operator damage on inadvertent backseating of the valve where the inaccuracies associated with the use of electromechanical torque switches are well-known.

The electronic torque switch of the present invention may be conveniently used with a thrust measuring and monitoring system of the type disclosed in the above identified copending application. The thrust measurement outputs provided by that system are particularly useful in establishing reference power signal levels and the time delays required to provide the desired level of valve seating thrust at motor deactivation at the end of the valve close stroke.

DESCRIPTION OF THE PREFERRED EMBODIMENTS

Figure 1:
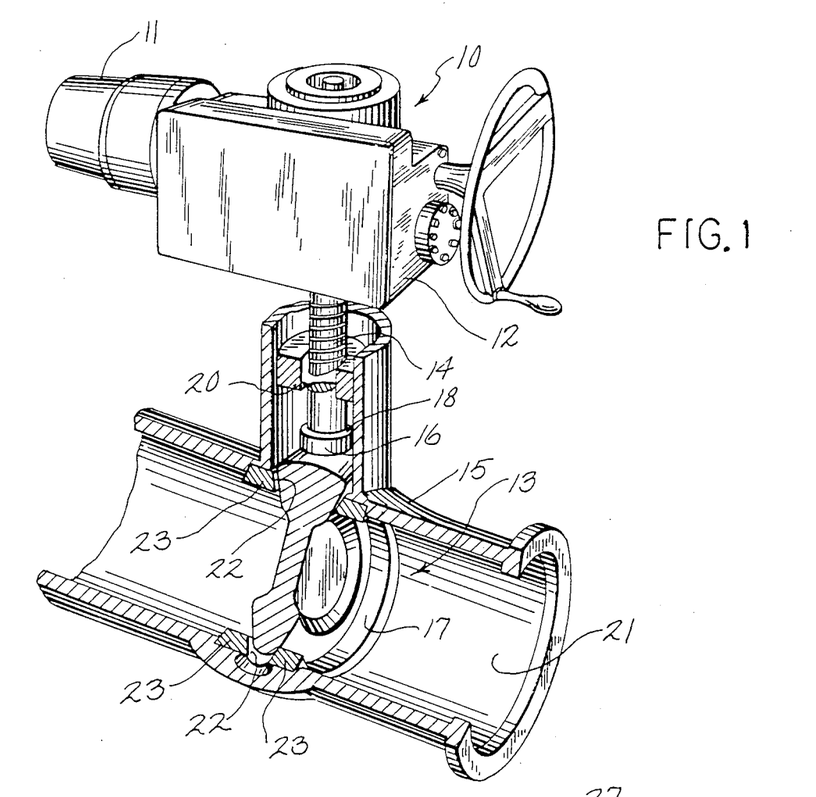
FIG. 1 is a perspective view of a typical motor operated valve assembly for the control of which the electronic torque switch of the present invention is particularly well adapted.

FIG. 1 shows a typical motor operated valve 10, including an electric torque motor 11, a mechanical power transmission assembly or operator 12, and a valve 13. Although various types of electric motors may be used, for larger valves, the motor 11 is often a 3-phase AC induction motor. The motor 11 drives the transmission assembly 12 which typically comprises a reducing gear set, a worm and worm gear, and a drive sleeve and stem nut journalled in the drive sleeve and engaging a threaded valve stem 14 to drive the valve stem vertically up or down.

The valve stem 14 extends downwardly from the transmission assembly 12 into the valve body 15 where it terminates in a journalled connection 16 to a valve plug 17. The valve plug 17 is adapted to move vertically with the valve stem 14 between the valve closed position shown and a valve open position with the plug moved vertically upward out of the flow path 21 and with the lower end 18 of the stem 14 spaced closely to (but preferably not in contact with) a backseat 20 formed as a integral part of the valve body 15.

The construction and operation of the foregoing motor operated valve is typical of that type described in greater detail in U.S. Pat. No. 4,856,327, identified above. The electronic torque switch of the present invention, to be described hereinafter, is particularly adaptable to control the operation of this type of valve, but may also be used to control the operation of a butterfly valve or a completely different type of system in which operating torque from an electric torque motor is applied to a workpiece.

As the valve stem 14 and attached valve plug 17 move downwardly at the end of the valve closing stroke, the edge of the plug will slide into the space between the faces 22 of the valve seat 23. Because of the corresponding wedge shape of the edge of the plug and the faces 22 of the valve seat, metal-to-metal sealing contact between the plug and the seat will quickly occur and a rapid rise in axial stem thrust will ensue. A corresponding rapid increase in motor operating power also occurs and, with the thrust, reaches a maximum at the point the plug is fully seated and the valve sealed. At this point, of course, power to the motor is interrupted and the motor stops. As previously indicated, prior art electromechanical torque switches and the methods of measuring stem thrust to establish the torque switch settings suffer from many deficiencies which often result in actual stem thrust inadequate to properly seal the valve or so high that excessive valve and operator wear or damage occurs.

Figure 2:
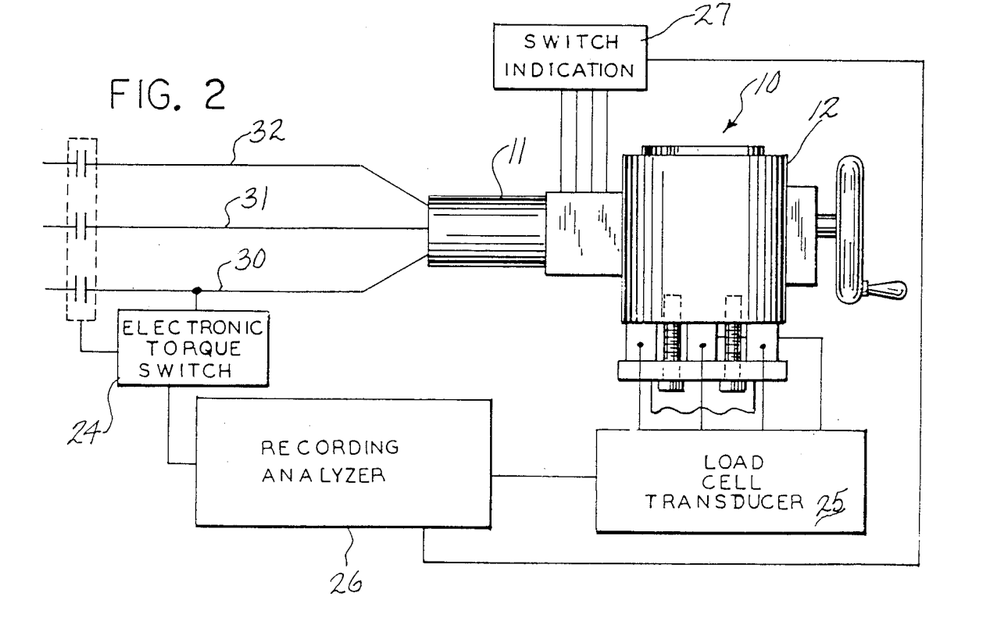
FIG. 2 shows the motor driven operator of FIG. 1 and a schematic block diagram representation of the control system including the switch of the present invention.

The present invention utilizes an accurate real time measurement of motor operating power, which is correlated to a signal representative of the level of operating torque and stem thrust necessary to properly seat and seal the valve, and to deactivate the torque motor 11 when the proper level is reached. Referring to FIG. 2, the electronic torque switch 24 of the present invention is readily incorporated into a torque measuring and monitoring system for motor operated valves of the type disclosed in previously identified pending Pat. application Ser. No. 144,949. That system has the capability of accurately measuring actual valve stem thrust over the full operating cycle of the valve and to relate measured thrust to other operating characteristics of the valve to allow more accurate setting of conventional torque and limit switches and to enable accurate analysis to be made of the operation of the motor operated valve. That system utilizes a load cell/load cell transducer arrangement 25 to generate actual stem thrust signals which are processed in a recording analyzer 26 to provide stem thrust measurements or graphic traces of stem thrust with time over the valve operating cycle. A switch indication assembly 27 is also used to provide an output trace of torque and limit switch operation with time over the valve cycle. The electronic torque switch 24 precisely measures actual operating power to the motor 11 and processes the power signal on a real time basis to control operation of both the open and close torque switches, as will be hereinafter described in more detail.

Figure 3:
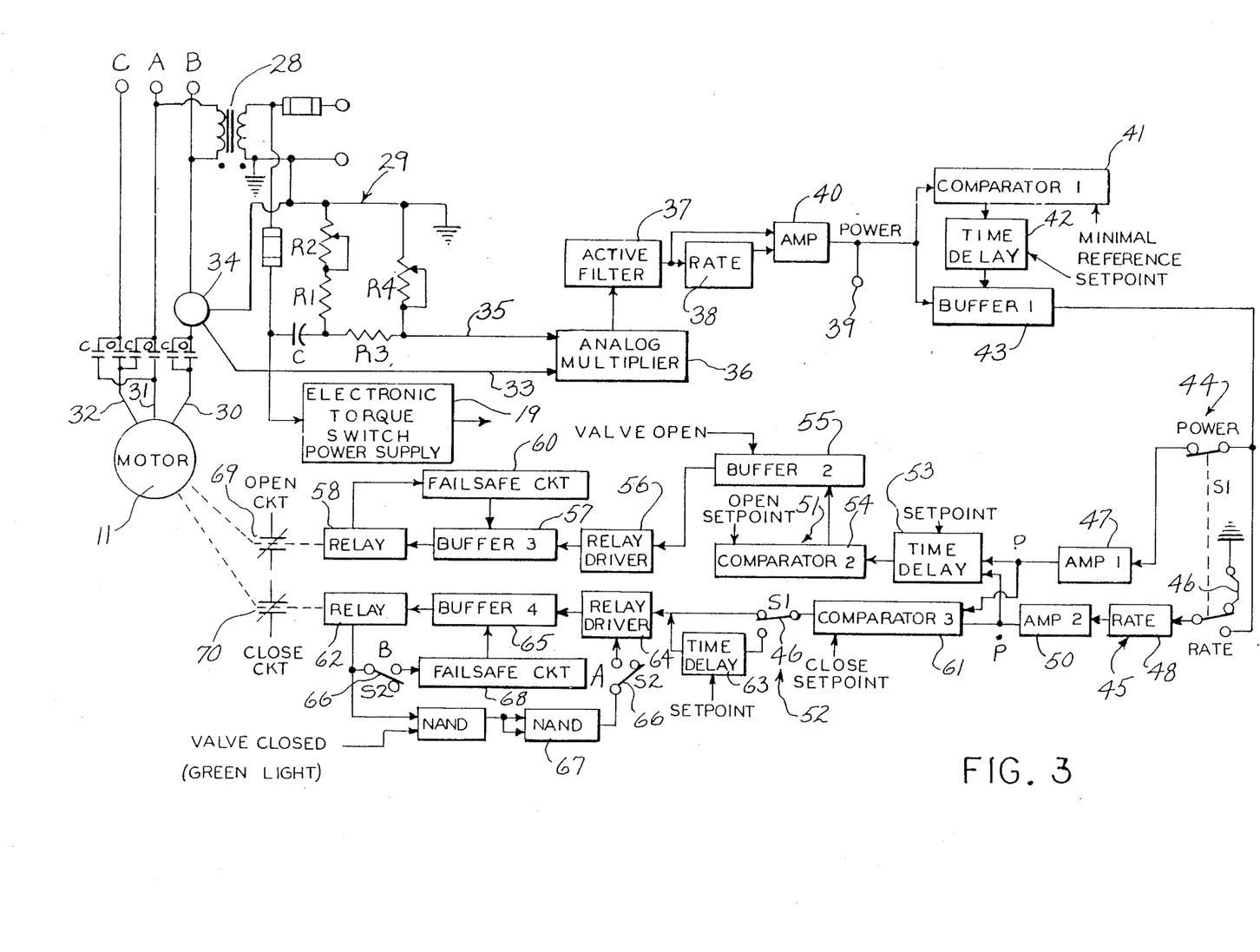
FIG. 3 is a schematic block diagram of the electronic torque switch of the present invention.

Referring also to FIG. 3, 3-phase power is supplied to the AC motor 11 via supply leads 30, 31 and 32. In a conventional manner, motor direction is controlled by sets of open O and close C motor contactors. The supply lead 30 which is not reversed, as the power supply phases in leads 31 and 32 are reversed to change motor direction, is used to obtain an input current signal 33. The current signal 33 is obtained from an inductive device 34, such as a Hall effect or sensitive current transformer, attached to supply lead 30. Power for the control circuit to the motor operated valve 10 is supplied by a power transformer 28 having its primary attached to motor supply leads 30 and 31. The output of power transformer 28 is also utilized to provide a voltage signal 35. The voltage signal 35 is first conditioned by a voltage sensing circuit 29, including an RC network and variable resistor to shift the phase and vary the magnitude of the voltage input signal 35 to the electronic torque switch 24. Phase adjustment is necessary to compensate for the phase lag introduced by the transformer and loading. Power from the transformer 28 may also be used for a power supply 19 for torque switch circuit components to be described.

The input current and voltage signals 33 and 35 are multiplied in an analog multiplier circuit 36 to obtain an output power signal. The analog multiplier 36 may comprise the circuit illustrated on page 12-22 of "Linear Integrated Circuits, 1984 Applications Guide", published by Raytheon Corporation, which circuit utilizes integrated circuits RC4200 and RC5534. The power signal from multiplier circuit 36 has a characteristic 120 Hz waveform (resulting from the product of two 60 Hz signals) and the signal must be filtered to eliminate the 120 Hz component without introducing an undesirable time lag. A state variable active filter circuit 37, such as that illustrated on page 6-34 of the above identified reference utilizing an LM148 integrated circuit, may be used.

The resulting DC level power signal is then processed by a rate circuit 38 to compensate for the 3 to 5 millisecond time lag introduced by the active filter 37. The rate circuit may comprise an LM324 or equivalent. An amplifer circuit 40, which may also comprise an LM324 or equivalent, is used to sum the power and time lag compensation signals to provide a motor operating power signal for the electronic torque switch 24 and for the recording analyzer 26. An appropriate power level monitor connection 39 to the recording analyzer is made at this point in the electronic torque switch circuit.

Figure 4:
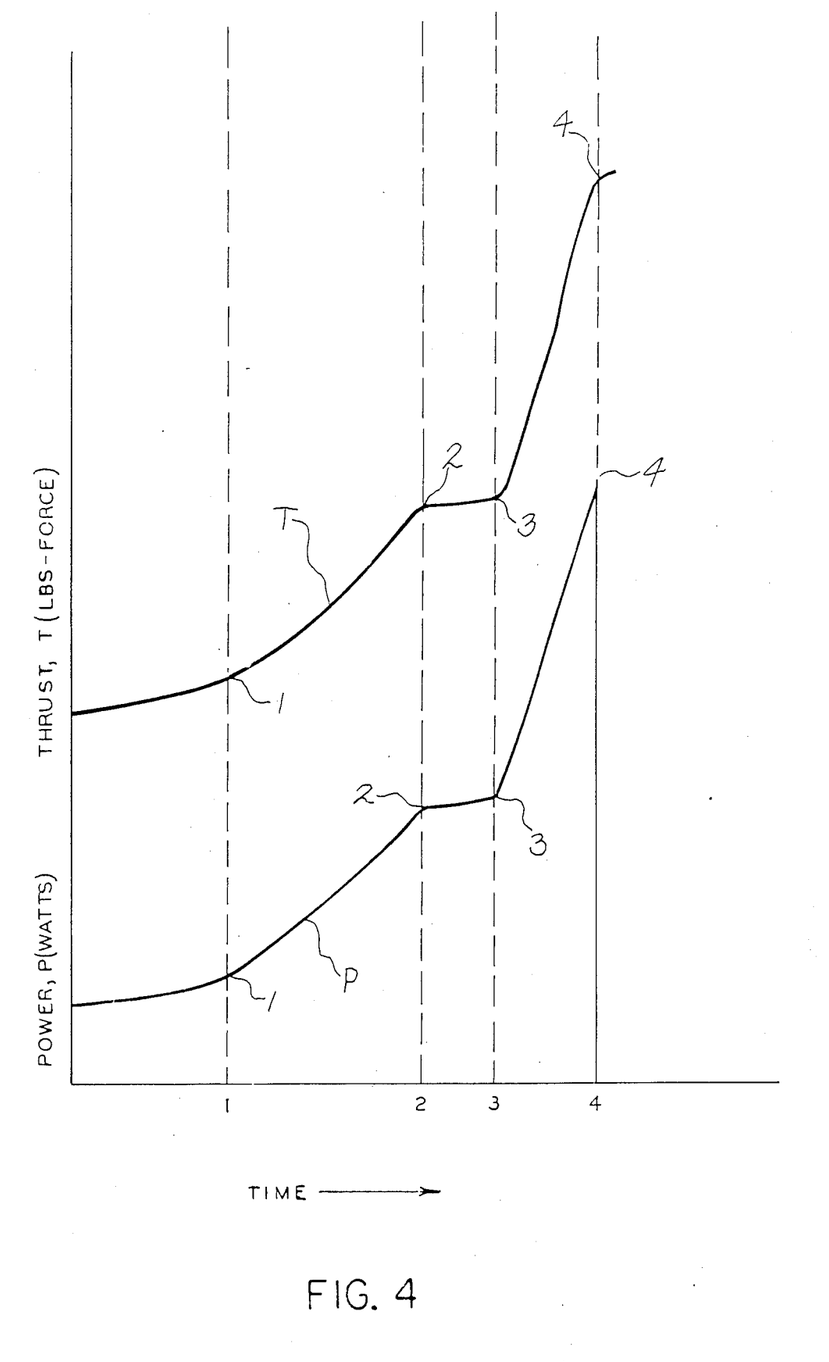
FIG. 4 is a graph or trace of valve stem thrust and torque motor operating power, both plotted as functions of valve operating cycle time.

FIG. 4 is a graphic representation of the traces of valve stem thrust and motor operating power which may be generated by the recording analyzer 26 as a result of the input of thrust signals from the load cell transducer 25 and power signals from the amplifier circuit 40 of the electronic torque switch 24. The curve T represents valve stem thrust, represented for example in lbs-force, and curve P represents motor operating power, in watts, with both curves representing movement of the valve plug 17 through the closing stroke from an open to fully closed position. The abscissa is representative of cycle time, as well as the position of the valve plug 17 in the valve body 15 as it moves toward the closed and fully seated position. The curves are similar in shape because of the direct correlation between stem thrust and operating power. In addition, of course, stem thrust is directly proportional to the operating torque delivered to the valve stem 14 by the motor 11. Analyzing each of the curves, beginning at the ordinate on the left, movement of the valve plug to point 1 requires a fairly minimal level of power P and correspondingly generates a fairly low stem thrust because the valve operator need only overcome the usual running loads, such as packing friction and gear train losses. Such fairly low levels continue over a major portion of the closing stroke. As the plug moves into the last part of the closing stroke, for example the last 20 to 30% of travel, the valve plug will begin to "pinch off" the fluid flow through the valve, resulting in an increase in operating power and stem thrust (or torque applied to the stem). This is the region between points 1 and 2 on the curves P and T.

At point 2, the edge of the valve plug 17 enters the region between the faces 22 of the valve seat 23. At this point, fluid flow has been essentially halted and the power and thrust both level off as indicated from point 2 to point 3. It should be noted, that the horizontal or time scale is substantially distorted for clarity and both the time and the distance moved by the valve plug between points 2 and 3 are quite small.

Point 3 represents initial metal-to-metal contact between the valve plug 17 and the valve seat 23. Actual movement of the plug is essentially halted, however, the motor power and corresponding stem thrust increase very sharply and continue to point 4 where the desired level of seating thrust is attained and the motor is deactivated. Upon motor deactivation at point 4, the operating power drops to zero but, because the valve plug is locked in the seat by the gear train lock up of the operator power transmission assembly, the thrust levels off and remains at the level holding the valve closed.

The direct correlation between operating power and stem thrust or torque allows the use of a power signal corresponding to a level of total desired stem thrust to deactivate the torque motor. Such an electronic torque switch when operated on a signal representative of the maximum power level closely simulates the operation of a conventional electromechanical torque switch, but with substantially enhanced performance. When electronic torque switch operation is based on a power level signal, a procedure similar to that described in previously identified Pat. application Ser. No. 144,949 may be used to establish the power level corresponding to the desired thrust. This is essentially a trial and error procedure, but the ability to eliminate the inaccuracies associated with prior art electromechanical torque switches makes substitution of the electronic torque switch very desirable.

However, the electronic torque switch may also be configured to operate on a signal representative of the rate of change of power with time. As may be seen in the power curve P of FIG. 4, the greatest rate of change in operating power occurs at the point of metal-to-metal contact as the valve plug is being torqued against the seat (from point 3 to point 4). Valve manufactures typically specify minimum sealing thrust levels required to maintain a leak-tight seal in a valve under specified differential pressure conditions. Using a rate of change of power signal and corresponding rate of change of thrust force signal, precise control of seating thrust may be attained.

For example, the maximum rate of change in power at or immediately after point 3 on curve P may be detected and used to generate a signal to trip the close torque switch. As indicated, however, valve manufacturers typically specify the level of seating thrust (in, for example, lbs.-force) necessary to properly seat the valve. From the corresponding point on the thrust curve T, the rate of change of thrust (force) with respect to time can readily be determined. The total specified sealing thrust, in lbs.-force, divided by the rate of change of force, in lbs./millisecond, will provide the time delay after initial metal-to-metal contact necessary to attain the desired level of sealing thrust. Additional time delay to provide a supplemental seating thrust, such as may be needed to overcome stem ejection forces under differential pressure operation, can be easily provided.

Similarly, the electronic torque switch may be used in lieu of an electromechanical torque switch as a backup to the conventional limit switch control when the valve is opened. As is known in the art, backseating is undesirable and limit switch control of the torque motor at the end of the open stroke is used to prevent backseat contact. However, there must be a backup and the electronic torque switch will provide a much more precise control than an existing electromechanical torque switch. Indeed, with an appropriate bypass of the open stroke electronic torque switch during most of the opening stroke, a relatively low rate of change of power signal can be used to trip the switch and deactivate the motor upon contact between the lower end 18 of the valve stem 14 and the backseat 20 (FIG. 1.)

Returning now to the schematic block diagram of the electronic torque switch 24 in FIG. 3, the properly filtered and conditioned psuedo-DC power signal from the amplifier 40 is first fed to a protective circuit used to prevent a power surge on motor start up from causing the electronic torque switch to trip. In other words, the start up surge may exceed the power signal or rate of change of power signal to be used to deactivate the motor at the end of the valve stroke. Thus, comparator circuit 41 provides a minimal power reference which, when exceeded, activates a time delay circuit 42 to delay transmission of the power signal (for example, for 15 to 80 milliseconds). Once the time delay circuit 42 has timed out, buffer circuit 43 is enabled to pass the power signal onto either a power circuit branch 44 or a rate of change of power circuit branch 45. Choice of one of the branches 44 or 45 enables control based on a maximum power signal or on a rate of change of power signal, as discussed above.

A triple pole, double throw switch 46 may be manually actuated and, in the power branch 44 position, the signal is amplified by amplifier 47 and, in the rate of change of power 45 position the rate circuit 48 takes the derivative of the power signal (to provide a rate of change signal) which is then amplified by amplifier 50.

The power signal P or the rate of change of power signal P from amplifier 47 or amplifier 50, respectively, may be utilized in either a valve open stroke circuit branch 51 or a valve close stroke circuit branch 52. In the open stroke branch 51, either the power or power rate signal is first input to a time delay circuit 53 which prevents unintended tripping of the open torque switch as a result of the power surge required to unseat the closed valve. It may also be desirable to bypass the open torque switch for the initial high differential pressure portion of the opening stroke. Until the valve is typically more than about 20 to 30% open, differential pressure forces from fluid flow will result in correspondingly high thrust requirements. Bypassing the open torque switch through this region not only prevents premature tripping of the torque switch, but allows the use of a relatively low setpoint thrust for ultimate open torque switch control which desirably limits the backseating thrust levels. Excessive valve packing friction resulting from over-adjustment may also be readily detected. After the appropriate delay for unseating and initial valve travel, comparator circuit 54 monitors the power or power rate signal against the predetermined setpoint thrust based on maximum or peak power or power rate for the backseating condition at the end of the open stroke. After the valve has been unseated and is travelling open, the valve open (red light) signal from the conventional limit switch control circuit is used to provide a voltage signal to enable the buffer circuit 55 to pass on trip signal to the OPEN relay driver 56. Buffer circuit 57 is normally enabled such that the OPEN relay 58 can be energized if a backseating signal is generated by comparator circuit 54 to deactivate the motor.

An important aspect of the of the electronic torque switch is that it may be placed directly in series with an existing electromechanical torque switch. Both the OPEN relay 58 and the CLOSE relay 62 (to be described hereinafter) utilize normally closed relay contacts 69 and 70, respectively, such that, if there is a failure in the electronic circuitry, the electromechanical torque switch provides an ultimate backup to limit the torque. A failsafe circuit 60 is used to disable the buffer 57 and deenergize the OPEN relay 58 (restore it to its normally closed condition) if the failsafe circuit detects an energized OPEN relay 58 for more than a selected period of time, such as 100 milliseconds. Returning the relay 58 to its normally closed position restores ultimate control to the electromechanical open torque switch, but requires manual resetting of the electronic torque switch.

If the valve is being closed, the power or power rate signal (from amplifier 47 or 50, respectively) is monitored by comparator circuit 61 against a set point power or rate of change of power signal representative of the desired level of seating thrust. If the power level signal mode has been selected (via switch 46), a signal exceeding the setpoint signal in comparator circuit 61 is passed on directly to energize the CLOSE relay 62 to deactivate the motor. However, if the rate of change of power mode has been selected, the power rate signal is fed to time delay circuit 63 until the time delay set point, based on the rate of change in thrust force, is exceeded and the CLOSE relay 62 is energized to deactivate the motor. The signal from comparator circuit 61, as in the case of the open stroke portion of the cycle previously described, operates relay driver 64 and passes through normally enabled buffer circuit 65 to energize and open the CLOSE relay 62.

In many applications utilizing valves that actuate automatically, the control system includes a so-called "autoclose" function which will automatically close the valve under certain conditions. If the system has an autoclose function, provision must be made in the electronic torque switch to disable the autoclose function once the valve has actually been closed. After the valve is torqued closed and the motor deactivated, the contacts 70 in the CLOSE relay 62 will reclose (to retain the normally closed mode). However, with the contacts closed and an autoclose signal present, certain types of valve operators will allow the valve to continuously attempt to reclose, which could ultimately result in serious damage to the valve or operator or burn-out of the motor.

In a system having an autoclose feature a double pole, double throw switch 66 is closed at contact A to enable the autoclose function. The protective autoclose disable feature utilizes a signal from energized CLOSE relay 62 and the normal valve CLOSED (green light) signal from a conventional control circuit which are input into series connected NAND gates 67 to provide the desired AND function. A failsafe circuit 68 of the same type and function as failsafe circuit 60 is included, but must be deactivated at contact B of switch 66 if the valve includes an autoclose function. However, it should be noted that, if the user interrupts the autoclose signal via an alternate means, the failsafe circuit 68 will not have to be deactivated. For example, the autoclose signal could be interrupted by a relay which energizes when OPEN valve indication (red light) is de-energized.

The various circuit components of the electronic torque switch 24 comprise conventional integrated circuits. The comparators 41, 54 and 61 may utilize LM339 or equivalent. The amplifiers 40, 47 and 50 are LM324 or equivalent. The rate circuits 38 and 48 and the time delay circuits 42, 53 and 63 may likewise utilize LM324 or equivalent. The buffers 43, 55, 57 and 65 are 4066 type and the NAND gates 67 are 7400 or 4011 or equivalent. The transistors used for relay drivers 56 and 64 are NPN types having an HFE greater than 100.

When the electronic torque switch is operated in the power level mode, utilizing the signal in the power circuit branch 44, it is important that the drive train efficiency in the valve operator remain relatively constant. Thus, it is correspondingly important that the user of a motor operated valve utilize effective preventive maintenance controls, including periodic lubrication checks and internal gearing inspections. By preserving relatively constant drive train efficiency, the relationship between power input and torque output will remain essentially constant. In this manner, the electronic torque switch 24 of the present invention relies for effective operation upon some of the same basic considerations applied in the use of existing electromechanical torque switches. Nevertheless, the electronic torque switch still provides a number of distinct advantages, including virtually infinitely variable torque control, installation and operation of the switch at a remote location, (i.e. the motor control center) where access to the motor operated valve may not be possible, and extremely accurate power measurement providing easy determination of changes in thrust demands and control adjustments as a result thereof.

When the electronic torque switch is operated in the rate of change of power mode, utilizing the rate circuit branch 45, changes in total thrust requirements, resulting for example from packing adjustments or degradations in drive train efficiency, will not affect operation of the torque switch to limit seating thrust to reasonable and accurately determined levels. When operated in this mode, the electronic torque switch provides a real ability to significantly minimize valve and operator wear.

Various modes of carrying out the invention are contemplated as being within the scope of the following claims particularly pointing out and distinctly claiming the subject matter which is regarded as the invention.

I claim:

1. In a motor operated valve assembly including a valve body, valve closure means within the body movable between a valve open position and a valve closed position, a valve stem attached to the valve closure means, an electric motor, and transmission means operatively connecting the motor and the valve stem for transmitting an operating torque from the motor to the stem for moving the valve closure means, an electronic torque switch for deactivating the motor at a desired level of operating torque on the valve stem comprising:

circuit means for generating a signal representative of motor operating power;
   means for generating a signal representative of motor operating power;
   means for generating a reference power signal representative of the desired level of operating torque;
   comparator circuit means for receiving said power signal and said reference signal and for generating an output control signal when said power signal exceeds said reference signal;
   switch means operable in response to said control signal to deactive the motor; and,
   wherein the motor is an a.c. motor and the circuit means for generating the power signal comprises:
   a multiplier circuit for generating a signal representative of a.c. power from the product of motor voltage and current signals; and,
   filter means for substantially filtering a.c. frequency components from the a.c. power signal.

2. The apparatus as set forth in claim 1 wherein said filter means comprises a state variable active filter.

3. The apparatus as set forth in claim 2 wherein the electric motor comprises a 3-phase a.c. induction motor and the operating power signal is generated from single phase voltage and current signals.

4. The apparatus as set forth in claim 2 wherein said power signal is representative of rate of change of power.

5. The apparatus as set forth in claim 4 including a timing circuit for integrating the output control signal from the comparator circuit means and a time signal to delay operation of said switch means.

6. In a motor operated valve assembly including a valve body, valve closure means within the body movable between a valve open position and a valve closed position, a valve stem attached to the valve closure means, an electric motor, and transmission means operatively connected the motor and the valve stem for transmitting an operating torque from the motor to the stem for moving the valve closure means, an electronic torque switch for deactivating the motor at a desired level of operating torque on the valve stem comprising:

means for generating an input voltage signal and an input current signal representative of the input voltage and current to the motor;

first circuit means for multiplying said voltage and current signals and for generating a signal based on the product of said voltage and current signals representative of motor power input to provide the operating torque;

second conduit means for receiving said power signal and for generating a signal representative of the rate of change of power;

comparator circuit means for receiving said rate of change signal and a setpoint signal representative of the desired level of operating torque, and for generating an output control signal when said rate of change signal exceeds said setpoint signal; and, switch means operable in response to said control signal to deactivate the motor.

7. The apparatus as set forth in claim 6 including time delay circuit means between said comparator circuit means and said switch means for delaying operation of said switch means.

8. The apparatus as set forth in claim 7 wherein the rate of change of power signal is representative of the maximum rate over the valve operating cycle.

9. The apparatus as set forth in claim 6 wherein the electric motor comprises an altering current induction motor.

10. The apparatus as set forth in claim 7 wherein the rate of change of power signal is representative of the maximum rate as the valve closure means moves into the valve closed position.

11. The apparatus as set forth in claim 6 including electromechanical limit switch means and torque switch means independent of said electronic torque switch and having a mechanical attachment to the mechanical power transmission means and electrical connection to the power source for said electric motor for terminating the operation of said motor at the valve open position and the valve closed position, and wherein said electronic torque switch includes a normally closed series electrical connection to said electromechanical torque switch means.

12. The apparatus as set forth in claim 11 wherein said electronic torque switch is operatively connected to said electromechanical torque switch means to provide primary control of motor deactivation in the valve closed position.

13. The apparatus as set forth in claim 11 wherein said electronic torque switch is adapted to provide back-up control to said electromechanical limit switch means in the control of motor deactivation in the valve open position.

14. A power measuring apparatus for providing a real time measurement of operating power for a 3-phase a.c. electric torque motor, said apparatus comprising:

means for generating single phase motor input current and voltage signals;

means for multiplying said current and voltage signals to provide an output power signal;

means for filtering said power signal to eliminate the high frequency component thereof and provide an average power signal; and, means for compensating for the time leg in the signal caused by said filtering means.

15. The apparatus as set forth in claim 14 wherein said multiplying means comprises an analog multiplier circuit.

16. The apparatus as set forth in claim 14 wherein said filtering means comprises a state variable active filter circuit.

* * * * *

UNITED STATES PATENT AND TRADEMARK OFFICE
CERTIFICATE OF CORRECTION

PATENT NO. : 4,987,358

DATED : January 22, 1991

INVENTOR(S) : TIMOTHY R. BRANAM

It is certified that error appears in the above-identified patent and that said Letters Patent is hereby corrected as shown below:

Claim 1, column 10, lines 33-34, delete "means for generating a signal representative of motor operating power;"; Claim 1, column 10, line 42, delete "deactive" and insert therefor --deactivate--; Claim 6, column 10, line 68, delete "connected" and insert therefor --connecting--; Claim 9, column 11, line 31, delete "altering" and insert therefor --alternating--; Claim 14, column 12, line 30, delete "leg" and insert therefor --lag--.

Signed and Sealed this

Twenty-sixth Day of May, 1992

Attest:

DOUGLAS B. COMER

*Attesting Officer*    *Acting Commissioner of Patents and Trademarks*